US012682638B2

(12) United States Patent
Heironimus et al.

(10) Patent No.: US 12,682,638 B2
(45) Date of Patent: Jul. 14, 2026

(54) SECURITY SYSTEM HAVING VIDEO ANALYTICS COMPONENTS TO IMPLEMENT DETECTION AREAS

(71) Applicant: Digital Monitoring Products, Inc., Springfield, MO (US)

(72) Inventors: Kyle Heironimus, Springfield, MO (US); Aaron McGhee, Ozark, MO (US)

(73) Assignee: Digital Monitoring Products, Inc., Springfield, MO (US)

( * ) Notice: Subject to any disclaimer, the term of this patent is extended or adjusted under 35 U.S.C. 154(b) by 95 days.

(21) Appl. No.: 18/431,176

(22) Filed: Feb. 2, 2024

(65) Prior Publication Data

US 2024/0265700 A1 Aug. 8, 2024

Related U.S. Application Data

(60) Provisional application No. 63/483,043, filed on Feb. 3, 2023.

(51) Int. Cl.

| | |
|---|---|
| *G06V 20/40* | (2022.01) |
| *G06F 9/451* | (2018.01) |
| *G06V 20/52* | (2022.01) |
| *H04L 61/5007* | (2022.01) |
| *H04N 7/18* | (2006.01) |

(52) U.S. Cl.
CPC .............. *G06V 20/44* (2022.01); *G06F 9/451* (2018.02); *G06V 20/52* (2022.01); *H04L 61/5007* (2022.05); *H04N 7/181* (2013.01)

(58) Field of Classification Search
CPC ........ G06V 20/44; G06V 20/52; G06F 9/451; H04L 61/5007; H04N 7/181

USPC .................................................. 348/143, 159
See application file for complete search history.

(56) References Cited

U.S. PATENT DOCUMENTS

| | | | | |
|---|---|---|---|---|
| 10,692,364 | B1 * | 6/2020 | Rao | G06V 20/41 |
| 11,200,407 | B2 * | 12/2021 | Russo | G06V 40/166 |
| 11,587,416 | B1 * | 2/2023 | Shafri | G06Q 10/0633 |
| 12,136,325 | B2 * | 11/2024 | Werner | G06F 21/629 |
| 2018/0070001 | A1 * | 3/2018 | Nassor | G06V 20/52 |
| 2019/0318171 | A1 * | 10/2019 | Wang | G06V 10/454 |
| 2022/0189267 | A1 * | 6/2022 | Sun | G08B 21/0492 |
| 2022/0335798 | A1 * | 10/2022 | Slawek | G06K 7/1413 |
| 2023/0186630 | A1 * | 6/2023 | Joseph | H04N 7/18 |
| | | | | 348/224.1 |
| 2023/0291870 | A1 * | 9/2023 | Russo | G08B 13/19645 |

* cited by examiner

*Primary Examiner* — Asmamaw G Tarko
(74) *Attorney, Agent, or Firm* — AVEK IP, LLC; Mark C. Young

(57) ABSTRACT

A security system having control panel zones implemented with video analytics is disclosed. The security system includes a control panel, with a video analytic component (VAC) connected to one or more cameras, in communication with the control panel. Defined camera detection areas within the field of view of the cameras automatically generate corresponding control panel zones, with detected events within the camera detection areas reported to the control panel similarly to conventional sensors. Setup of communication between the VAC and the control panel is automatically facilitated by a server, with subsequent communication between the two occurring directly. The system provides for integration of cameras as sensors, with collected video further stored for later review.

20 Claims, 8 Drawing Sheets

330

Detect VAC
and control panel — 332

Determine available
communications channels — 334

Assign ports of
of VAC and control panel — 336

Direct communication
between VAC
and control panel — 338

SECURITY SYSTEM HAVING VIDEO ANALYTICS COMPONENTS TO IMPLEMENT DETECTION AREAS

CROSS-REFERENCE TO RELATED APPLICATION

This application claims the benefit of U.S. Provisional Patent Application No. 63/483,043 filed Feb. 3, 2023, the disclosure of which is incorporated by reference herein.

BACKGROUND

Security systems are commonly used at residences, businesses, public buildings, and other indoor and outdoor locations to monitor and report potentially suspicious, undesired, and/or criminal activity in those areas. In addition to simply responding to opened doors or windows, many security systems include multiple types of sensors and distinguish between various types of detected activity. Motion sensors are commonly used to detect movement within their field of view, and video cameras are often incorporated with security systems to provide streaming real-time or recorded video that can be viewed by personnel at a central monitoring station or directly by end users (such as homeowners or business owners) to assist in determining whether a detected event is valid and/or whether the detected event should trigger an alarm or response.

For example, a central monitoring system receiving an alert from a door contact sensor indicating that a door was opened after-hours in a business may direct personnel to view a video stream from a camera with a field of view covering that door to allow the personnel to determine whether the door was actually opened and gather any other information in the video stream to allow the personnel to determine if there is a concern or threat, such as an unauthorized person in the area. The use of video surveillance systems with security systems has become common as the video surveillance provides additional information to confirm or refute whether an event detected by security system sensor merits a further response, thus preventing unnecessary deployment, for example, of police or security personnel which results in inconvenience and incurred expense.

While the use of video surveillance (i.e., information gleaned or derived from the video stream) is useful in conjunction with a security system, it typically requires personnel-intensive assistance, with central monitoring station personnel, or business owners or homeowners, required to view the video and make determinations based on what they see in the video.

In the limited instance where a surveillance camera with video analytics may be used as a sensor in conjunction with a security control panel, the camera with analytics and control panel remain separate components that each must be setup and programmed separately, requiring the programmer to use several different programs for the individual components to establish, set up, and maintain the use of a camera with video analytics as a sensor in the security control panel.

Thus, it can be seen that there remains a need in the art for an improved system for integrating video analytics and control panel components in security systems.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes a security system having integrated control panel and video analytic components such that a user is able to set up, program, and implement video analytics on live surveillance video as sensors for control panel zones concurrently through a single interface.

In one embodiment, the security system includes a control panel component in communication with a video analytic component (VAC). The VAC is in communication with one or more surveillance cameras and is operable to detect specified events in the fields of view of the cameras and communicate detection of the events to the control panel in a manner similar to that of conventional sensors such as door or motion sensors. A server in communication with the control panel facilitates the initial setup of communication between the control panel and the VAC, with subsequent communication between the control panel and the VAC occurring without involvement of the server.

In another embodiment, a user may enter initial setup of communication between the control panel and the VAC by entering communication parameters using a keypad or other user interface on the control panel, with subsequent communication between the control panel and the VAC occurring without further setup or initiation.

In another embodiment, the communication between the control panel and the VAC may be established by wired connection either by combining the VAC and control panel in a single housing or each in individual housings.

In one aspect, the system includes a user interface to allow a user to define one or more camera detection areas within the field or fields of view of one or more cameras for the VAC to detect and identify specified events occurring within those camera detection areas. In another aspect, the system includes a user interface to allow a user to define the events for the VAC to detect in each defined camera detection area. The detected events may include motion, movement, persons, vehicles, animals, and other detectable events. In another aspect, the VAC includes video circuitry operable to identify motion, movement, persons, vehicles, animals, or other characteristics associated with the detectable events, and is operable to communicate the detection of the specified event to the control panel. In another aspect, the system includes a user interface to allow a user to define the control panel response to a specified detected event based on circumstances and variables specific to the security system's location including schedule, physical presence, or user input parameters. In another aspect, the system includes a user interface to allow a user to define whether and when the VAC communicates a specified detectable event to the control panel based on circumstances and variables specific to the security system's location including schedule, physical presence, or user input parameters.

In a further aspect, control panel zones are created automatically upon creation of the camera detection areas, with separate control panel zones corresponding to separate camera detection areas.

In another aspect, an initial setup of communication between the security panel and the VAR includes assignment of communication ports by the server, or by entry by a user through the security panel, and in a further aspect subsequent communication between the security panel and the VAR occurs directly after the initial setup without involvement of the server.

In a further aspect, video captured by the VAC may be viewed by users in real-time or may be stored and viewed or reviewed at a later time.

Thus, the security system having control panel zones implemented with video analytics allows the security system to incorporate video into the system as a sensor, allowing specified detectable events within the field of view of a camera, defined as significant at the time of occurrence, to trigger alerts by the control panel in real time, without requiring a person to review the video and make a determination. Control panel zones are created, configured, and updated automatically upon creation, configuring, and updating of camera detection areas within the field of view of the cameras, eliminating the need for a person to separately create and configure a control panel zone corresponding to each defined detection area. The setup of communication between the VAC and the control panel may be implemented automatically through a server, with subsequent communication between the VAC and the control panel occurring directly. In some embodiments, setup of communication between the VAC and the control panel may be by wire connection.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include apparatus, systems, and methods for a security system having control panel zones implemented with video analytics. Various embodiments employ various techniques for detecting events using a camera, a video analytic component (VAC), and a control panel. Initial communication between the control panel and the VAC may be facilitated by a server. Defined camera detection areas automatically instigate the creation of corresponding control panel zones, with detection of defined significant events within the camera detection areas triggering defined responses from the corresponding control panel zone. The VAC includes video circuitry operable to detect and determine the nature of events that occur in the field of view of the camera in real time.

Figure 1:
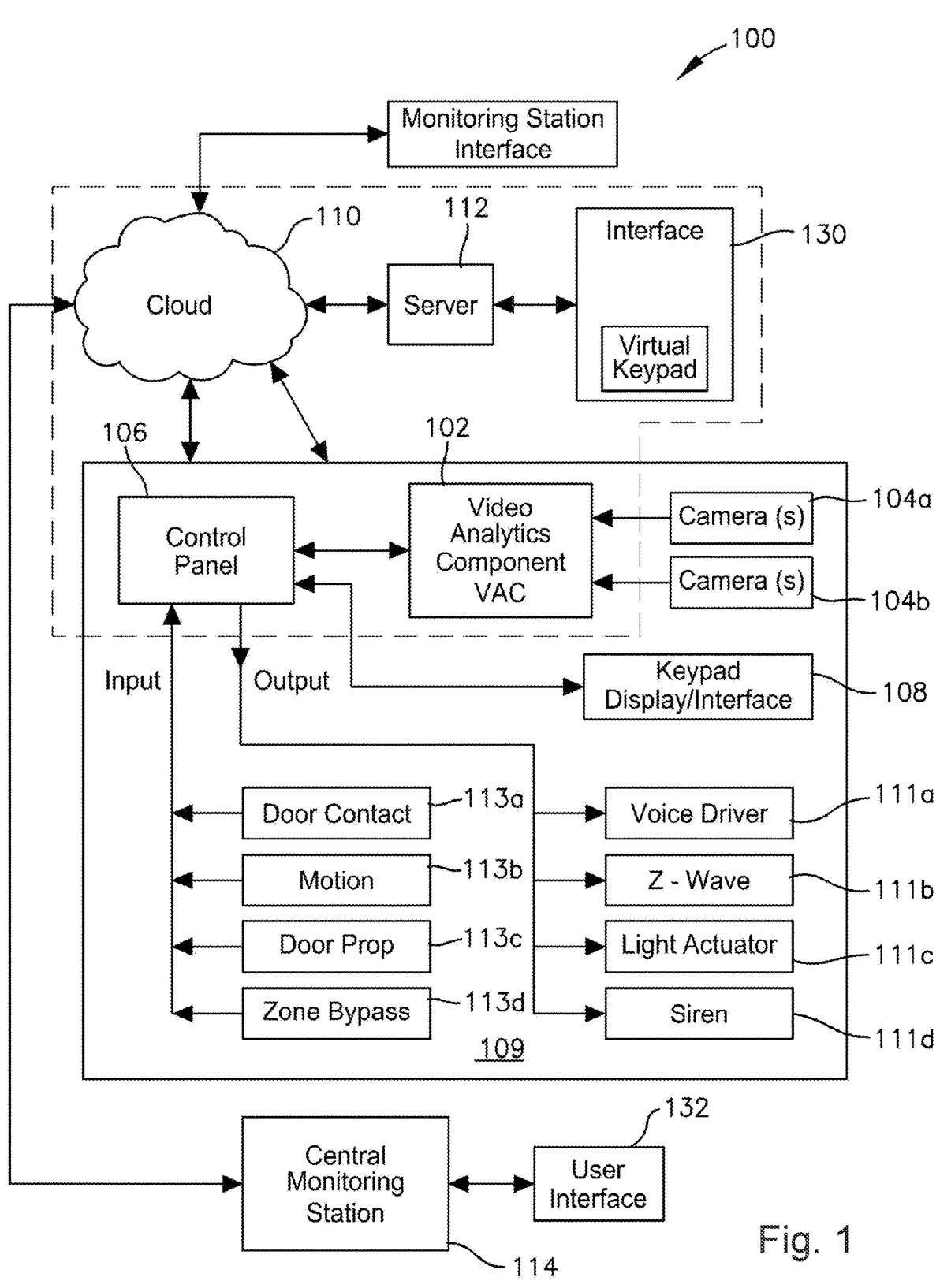
FIG. 1 is a block diagram of a security system having control panel zones implemented with video analytics in accordance with an exemplary embodiment of the present invention.

Looking first to FIG. 1, a security system having control panel zones implemented with video analytics in accordance with an exemplary embodiment of the present invention is depicted generally as 100. The security system includes a control panel 106 in communication with a video analytic component (VAC) 102, with the VAC connected to a plurality of cameras 104a, 104b which are operable to provide video signals to the VAC 102. As will be described in more detail below, the field of view of the cameras 104a, 104b cover areas that may be monitored by the security system 100. The control panel 106 may output communication to a local keypad/display/interface component 108, a central monitoring station 114, and a server 112 via local network connections or cloud 110 links, and may output to local system components such as a voice driver 111a, a Z-Wave device or interface 111b, a light actuator 111c, or alarm siren 111d. The control panel 106 may receive communication input from a user interface 130 through the cloud 110 and/or one or more local interfaces such as a door contact 113a, a motion sensor 113b, a door prop detector 113c, or a zone bypass 113d. The VAC 102 may similarly be in communication with the server 112 via network or cloud 110 links. Server 112 and central monitoring station 114 each include a preferably include user interface 130, 132, respectively, to allow a user or installer to interact with the security system 100. The control panel 106 likewise may have one or more user interfaces such as a keypad and display interface 108 that may be incorporated into the control panel and/or located in the local area 109 and may communicate directly or may communicate over a network.

As depicted in FIG. 1, VAC 102, cameras 104a, 104b, control panel 106, and local interface and local monitoring station keypad/display interface 108 are configured together in general proximity in a local area 109, and may communicate directly with each other or may communicate over a network. The local area 109 may be and/or may include one or more structures such as a house, an office building, a warehouse, a garage, bank or other financial institution, a restaurant and/or other businesses, a storage unit, a museum and/or other public buildings, and/or other structures; geographical areas such as fenced yards (e.g., a backyard, a company vehicle yard, etc.), parks, parking lots, car lots, lumber or supply yards and/or other geographical areas; and/or other locations of interest.

Central monitoring station 114 and server 112 are located outside of the local area 109, and communicate to the devices within the local area 109 via one or more cloud connections 110, such as a wide area network (WAN) such as the Internet. It should be understood that the arrangement and location of the devices is exemplary and not limiting, and that the placement and location of the devices may vary without deviating from the scope of the present invention. In an exemplary embodiment, central monitoring station 114 is a remotely located center staffed with personnel responsible for monitoring alarm events generated by the control panel 106 and/or by the local monitoring station keypad/display interface 108 and to, for example, review the alarm events and/or video from the location and direct a response from police or security personnel, if necessary. It should be understood that the ability of the control panel 106 of the present invention to communicate to a central monitoring station does not require a central monitoring station in implementing the features of the present invention. The security system of the present invention may operate without such a central monitoring station or may operate in the event a communication link with the central monitoring station is severed.

Local monitoring station and display/keypad interface 108 is preferably configured to monitor the security of the local area 109 and receive alarm events. In some implementations, local monitoring stations may include one or more of a local interface, a processor, electronic storage, and/or other components. Responsive to receiving notice of an alarm event through a local interface or detecting an event through in person monitoring, a local monitoring station may generate an indication of the alarm event for transmission to the server 112 or to the central monitoring station 114. An alarm event may include one or more of a perimeter breach, unexpected and/or unauthorized movement, detection of a person or persons in an unauthorized area of the location of interest, glass break, detection of smoke, carbon monoxide and/or water, and/or other alarm events. In exemplary embodiments, the detected alarm event may be a signal originating from the VAC 102 based on an event detected by the VAC within a camera detection area defined within the cameras' field of view.

In an exemplary embodiment, server 112 is an off-site, remotely located server in communication with the security system 100 via a network or cloud 110 interface connection and is operable to communicate with devices of the security system, such as the control panel 106, local and remote interfaces 130, and video analytic component 102. As described below, the server is configured to set up and facilitate communication between the control panel 106 and the VAC 102 such that setup of the VAC 102 automatically causes set up of the control panel 106, without requiring separate interface or user instruction to the control panel.

In some embodiments, video, images, events, and other information from the components of the security system may be stored on the server 112 for archival purposes, or to allow real-time viewing or monitoring, and to allow later review of those events, images, and videos. In further embodiments, the cameras may connect to the security system through the server 112, and/or the cameras may communicate to the server 112.

Server 112 preferably includes one or more processors, memory, and storage such as hard disc drives or other storage devices. As is known in the art, server 112 may be a single server at a single location, or may comprise multiple individual servers at dispersed locations.

Any of the server 112, local monitoring station 108, and central monitoring station 114 may include a user interface to allow interaction between users and the associated component and/or other components of security system 100. The user interfaces 112, 114, may be touch screen devices, displays with a keypad, displays with associated keyboard and mouse, personal computers, laptop computers, mobile devices, or other communications devices as known in the art.

Figures 2A, 2B:
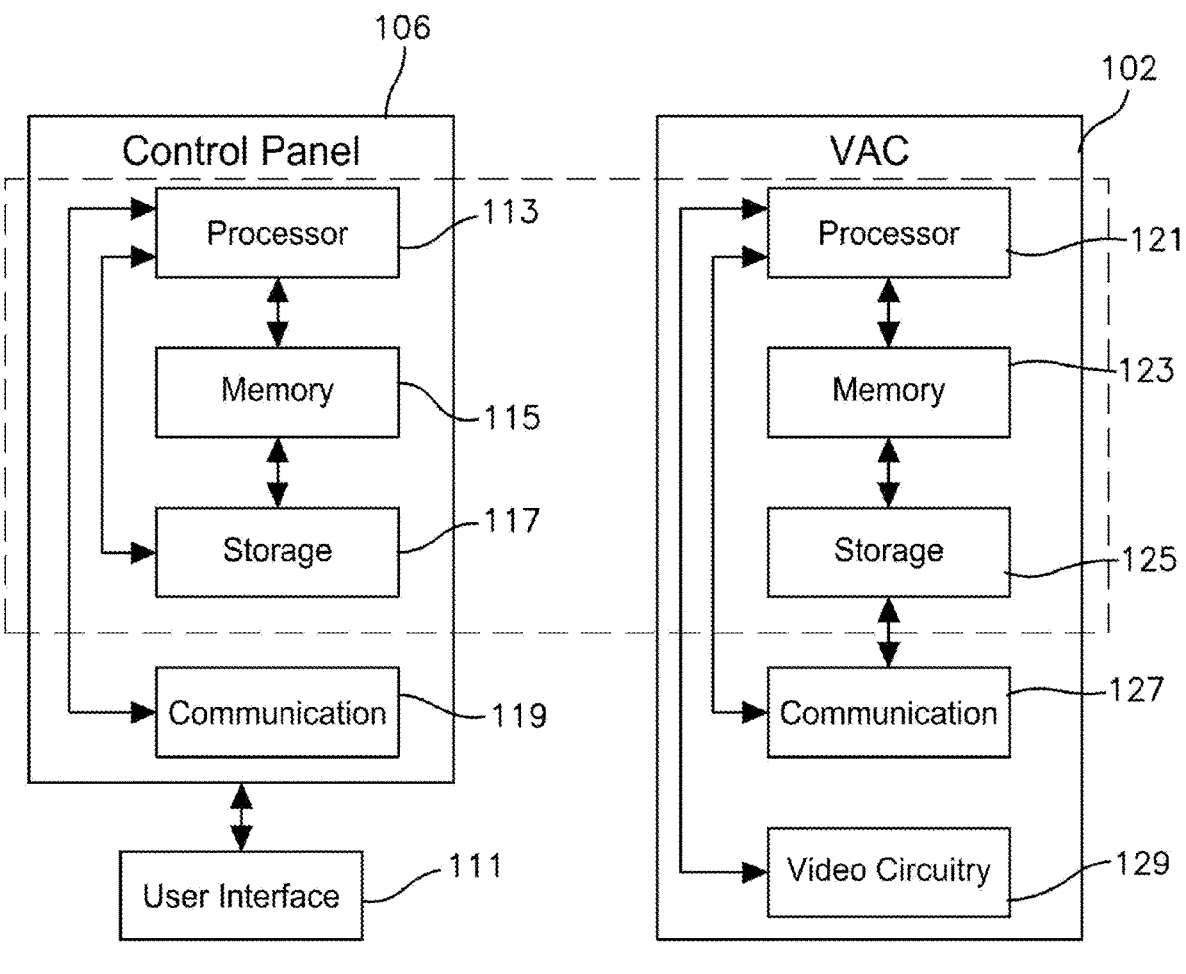
FIG. 2A is a block diagram of a control panel component of the system having control panel zones implemented with video analytics of FIG. 1.
FIG. 2B is a block diagram of a video analytic component (VAC) of the system having control panel zones implemented with video analytics of FIG. 1.

Looking to FIGS. 2A and 2B in conjunction with FIG. 1, the control panel 106 and video analytic component 102 will now be described in more detail. Turning to FIG. 2A, control panel 106 is a local control panel that interfaces to the security system, that arms and disarms the system, and controls the parameters associated with the security system. As seen in FIG. 2A, the control panel 106 comprises a processor 113, memory 115, and storage 117 to allow the panel to perform various operations by the processor executing instructions stored in the memory and/or storage. Communication circuitry 119 allows the control panel 106 to communicate with devices in the security system 100 over local or wide area networks as previously described.

In preferred embodiments, the user interface 111 is a separate component from the control panel and is typically located away from, e.g. in another room, from the control panel. In alternative embodiments the user interface 111 may be incorporated into the control panel or positioned in close proximity to the control panel.

In some embodiments, the user interface may comprise a touch screen, a display and keyboard, or other user display and input devices. In further embodiments, the user interface may be a mobile device or external touch screen, tablet, or device connected to the control panel via a wireless interface. The user interface may additionally include an alarm, buzzer, and/or beeper to allow the control panel to provide audible alerts to users. In some embodiments, the user interface may include interface circuitry to allow connection of an external audible alarm and/or alert light.

As seen in FIG. 2B, the video analytic component (VAC) 102 comprises a processor 121, memory 123, one or more storage devices 125, communications circuitry 127, and video circuitry 129. Processor 121 and memory 123 are operable to execute instructions to cause the VAC to perform various operations as commanded by a user by instructions received from the server 112 (via communication circuitry 127). Video circuitry 129 provides for communication between the VAC and one or more cameras 104a, 104b, and ability to process the signals received from the cameras.

As depicted by the dotted line in FIGS. 2A and 2B, in some embodiments the VAC and control panel may share a processor, memory, and/or storage, in further embodiments the VAC and/or control panel may share a processor, memory, and/or storage with other devices, such as cameras.

Cameras 104a, 104b are preferably video cameras configured to provide a video signal to the VAC 102 and may be for indoor and/or outdoor use. If the signals provided by the cameras are analog signals, the video circuitry 129 of the VAC preferably includes analog-to-digital (A/D) conversion circuitry to convert the signals to digital for further processing. The incoming video streams, or parts thereof, may be stored on storage 125 which may comprise hard disc drives, solid state drives, optical drives, or other storage medium. In some embodiments, video streams may be stored on the server 112. The stored video may be saved for archival purposes or may be retrieved by a user to review events or alarms as desired. In some embodiments the live video stream may be transmitted to the server 112, to the local monitoring station 108, to the central monitoring station 114, or to another user interface connected to the local or wide area network.

In exemplary embodiments, video circuitry 129 further includes facial recognition, object recognition, and/or other analytic engines or software to allow the circuitry to detect events, identify movement, motion, objects, aggression, crowds, occupancy, loitering, tampering, people, animals, vehicles, license plates, and other identifiable features in the video stream from the cameras. VAC 102 may thus provide signals and/or triggers to the control panel 106 in a manner similar to conventional sensors to allow the control panel to process the signal. In some embodiments, the VAC 102 may provide additional information to the control panel identifying the type of event (e.g., a person detected).

In further embodiments, the VAC may access historical, schedule, or other data and information for use in processing and determining whether an event is significant and should be signaled to the control panel, or whether, based on the historical or other information, the event may not require notification to the control panel. For example, the VAC may detect activation of a dusk-to-dawn security light in a camera detection area at the same time every evening which would typically instigate a notification to the control panel of the event. Based on historical data, the VAC may be trained or may learn to determine the significance of the detected event and whether the event should not be reported or signaled to the control panel. In further embodiments, the video circuitry 129 of the VAC may apply that historical data to similar though not identical events through the use of logic, neural networks, machine learning, or other algorithms and circuitry such that a similar activation of a different light at a continuous schedule is recognized by the VAC as not requiring notification to the control panel. It should be understood that the detection of the light as just described is exemplary, and that the video circuitry of the VAC may similarly learn or be trained to recognize other types of events as significant, requiring notification to the control panel, or not, in which case a signal or notification may not be necessary.

As just described, it can be seen that the security system having control panel zones implemented with video analytics allows the security system to use cameras connected to the VAC, to act as sensors to detect in real time objects and movement within various camera detection areas defined within cameras' field of view that is significant to the system's user and to notify the control panel of a detected even in a manner similar to conventional sensors.

With the hardware and configuration of the security system set forth, the configuration and operation of the security system will now be described with reference to FIGS. 3 through 7, and with reference back to FIGS. 1, 2A, and 2B.

Figure 3:
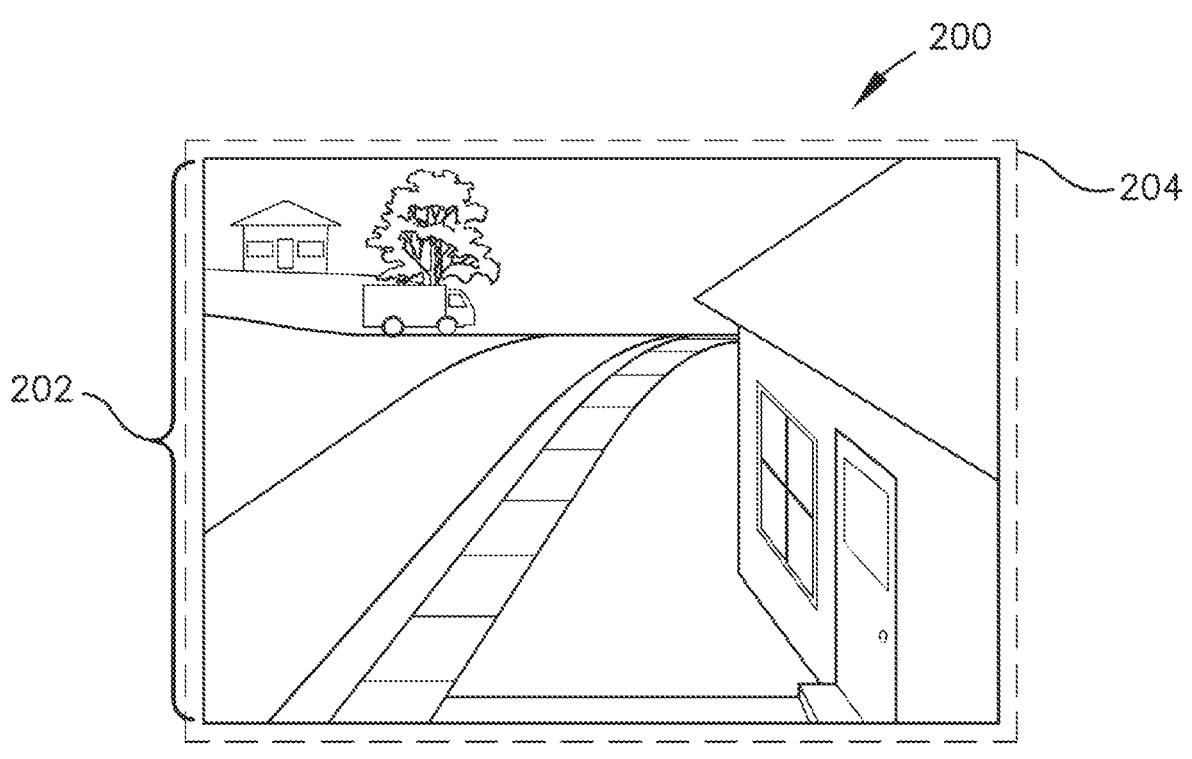
FIG. 3 is a schematic diagram of a field of view of a camera and a defined camera detection area in accordance with an exemplary embodiment of the present invention.

Looking first to FIG. 3, a field of view of a camera and a defined camera detection area are depicted generally as 200. The field of view of a camera as seen on a monitor or viewing device is depicted as element number 202. As shown in the figure, the view is an exemplary view of an area to be monitored or protected by the security system. And, as can be seen in the exemplary view, the field of view of the camera covers numerous objects—a distant house, a truck travelling on a distant road, a sidewalk, and a near house having a door and a window. Using a user interface, such as the user interface 130 of the server 112, a user communicates with the VAC 102 and defines a camera detection area 204 within the field of view 202 of the camera. Thus, in the exemplary embodiment as seen in FIG. 3, the camera detection area 204 encompasses the entire field of view of the camera.

Upon defining the camera detection area 204, the server 112 communicates with the control panel 106 and automatically creates a control panel zone corresponding to the defined camera detection area 204. With the control panel zone thus created in the control panel 106, the corresponding camera effectively acts as a sensor wherein any detected event occurring in the camera detection area 204—such as movement, a person, a vehicle, etc.—signals or triggers the control panel which processes the detected event according to the control panel settings. For example, if the security system is armed, the detected event may cause the control panel to generate an alert or sound an alarm. If the security system is not armed, the detected event may be reported or not reported, with no alarm generated. Thus, as described in this exemplary implementation, the camera connected with VAC acts as a sensor input to the control panel.

Figure 4:
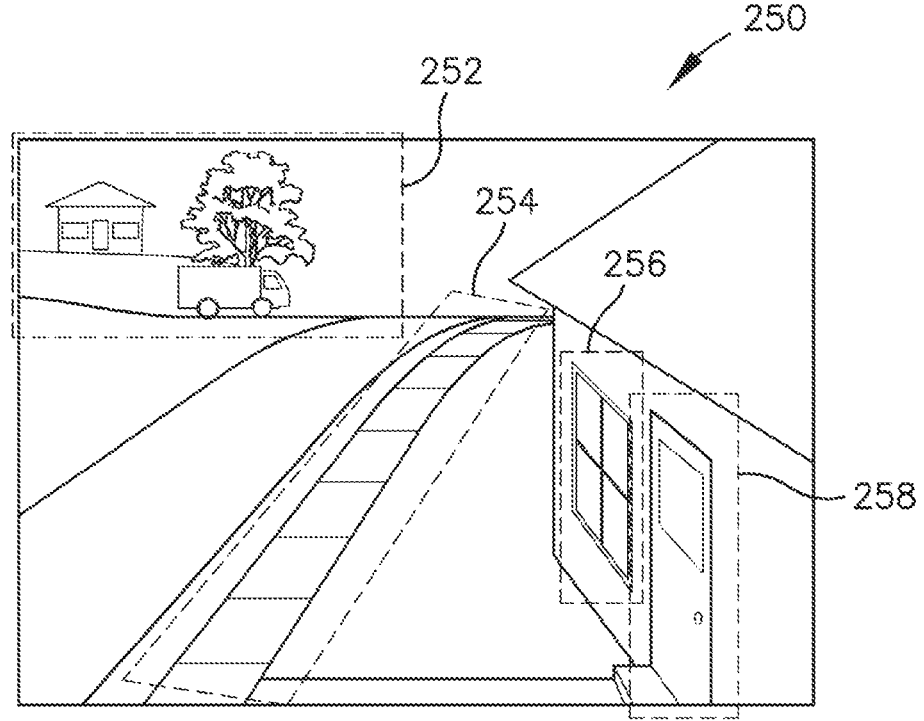
FIG. 4 is a schematic diagram of a field of view of a camera and a plurality of defined camera detection areas in accordance with an exemplary embodiment of the present invention.

Looking now to FIG. 4, a field of view of a camera 300 may similarly be configured with multiple camera detection areas. In this exemplary implementation, the field of view of the camera is the same as that just described with respect to FIG. 3. However, as seen in FIG. 4, a user, using a user interface (such as the user interface 130 of the server 112), communicates with the VAC 102 and defines four distinct camera detection areas—the distant house and road 302, the sidewalk 304, the window of the near house 306, and the door of the near house 308. Thus, each camera detection area covers a separate and distinct area of the field of vision of the camera.

Upon defining the camera detection areas 252, 254, 256, and 258, or as each camera detection area is defined, the server 112 communicates with the control panel 106 and automatically creates a control panel zone corresponding to each of the defined camera detection areas—i.e., four distinct control panel zones are created. Thus, each camera detection area corresponds with a unique one of the created control panel zones. With those four control panel zones thus created at the control panel 106, the corresponding camera connected with VAC effectively acts as four distinct sensor inputs for the control panel wherein a detected event occurring in a defined camera detection areas 252, 254, 256, 258 signals the control panel 106 which processes responds to the detected event according to the control panel settings. For example, if the security system is set for detection, or "armed", a detected event in a particular detection area may cause the control panel to generate a local response including turning on lights, sounding a siren, or activating a voice driver and/or remote response including notification to the central monitoring station, local monitoring station end user through the remote interface. If the security system is not set for detection, or "disarmed", the detected event may or may not, cause the control panel to send notification of the event, with no local response generated.

Thus, as described in this exemplary implementation, the camera acts as a four distinct sensor inputs to the control panel. It should be understood that the definition of camera detection areas as described is exemplary, and that other configurations are contemplated within the scope of the present invention. For example, multiple defined camera detection areas may potentially overlap, such that a detectable event in a particular area of the field of view of the camera 250 may occur in multiple camera detection areas, and that each of the corresponding control panel zones may thus be triggered by that single event. It should also be understood that the individual control panel zones may be instructed to perform varying operations, including the local responses and remote notifications identified in this example.

Figure 5:
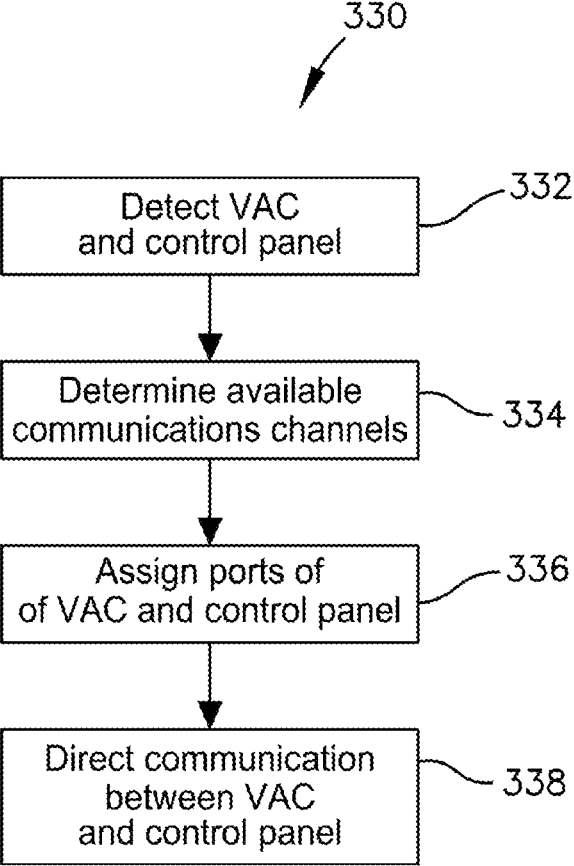
FIG. 5 is a flow diagram of an exemplary automatic configuration of communication between a control panel and a video analytic component of the system having control panel zones implemented with video analytics of FIG. 1.

Looking to FIG. 5, as described above, the server 112 facilitates initial communication setup between the control panel 106 and the VAC 102, the steps of that process are designated generally by numeral 330. At block 332, the server detects and communicates with the VAC and the control panel. At block 334, the server automatically determines available communications ports and appropriate communications protocols, such as Internet Protocol (IP). At block 336, the server configures the VAC and the control panel and assigns or allocates the desired communication ports and protocols. At block 339, direct communication between the VAC and the control panel have been established, and the VAC and the control panel subsequently communicate directly without further intervention or involvement of the server. In alternative embodiments, a user may initialize communication setup between the control panel 106 and the VAC 102 by entry of communication parameters through the user interface 111 of the control panel 106 or the VAC may be incorporated into the control panel such that direct communication is already established. Once initialized, subsequent communication between the control panel 106 and the VAC 102 may occur without further intervention of the user, and without involvement of the server 112.

Figure 6:
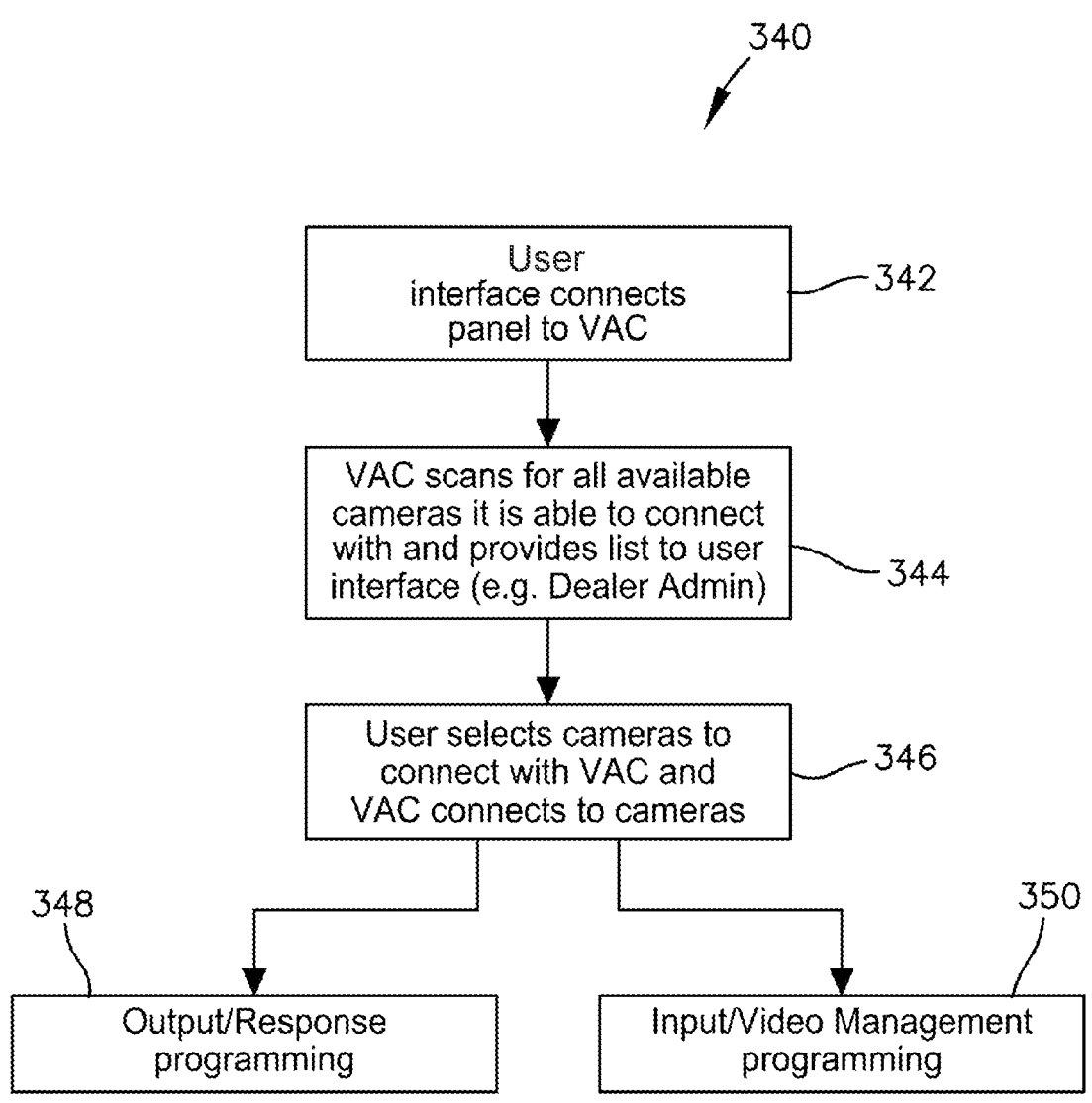
FIG. 6 is a flow diagram of an exemplary method of automatic detection by, and connection of cameras to, the video analytics component (VAC).

Turning to FIG. 6, an exemplary method of automatic detection and connection of cameras to the video analytics component (VAC) is depicted generally by the numeral 340. At block 342, a user using a user interface 130 as shown in FIG. 1, initiates connection with the VAC. At block 344 the VAC scans the network for all cameras available for it to connect to and provides a list of those cameras to the user via the user interface. At block 346, the user selects the desired cameras to be connected to the VAC. At block 348 the appropriate output/response programming is initiated as described in FIG. 7, below and at block 350 the input/video management programming is initiated as described in FIG. 8, below. In other embodiments, the VAC may be incorporated directly with and/or in the camera and communication established by wired connection.

Figure 7:
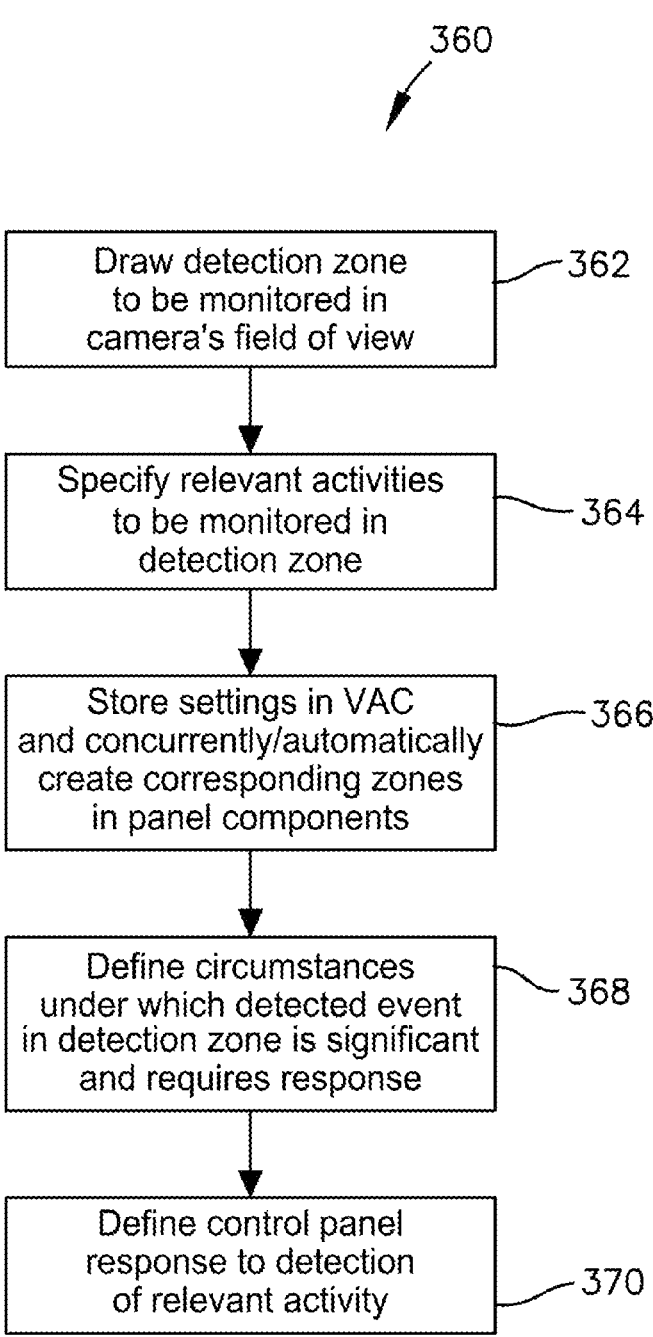
FIG. 7 is a flow diagram of an exemplary configuration of detection zones within the video analytics component (VAC).

Looking to FIG. 7, an exemplary method of defining detection zones in the field of view of a camera is depicted as 360. At block 362, a user defines a detection zone to be monitored in the camera's field of view, in a manner similar to that described above with respect to FIG. 4. At block 364, the user specifies relevant activities to be monitored in the defined detection zone, such as motion, detection of a person, etc. At block 360 the detection zone and associated detection activities are stored in the VAC, and corresponding zones in the control panel components are defined automatically. At block 368 a user defines specific circumstances under which a detected event in a detection zone is deemed significant such that a response is required, such as time of day, repetition of an event, uniqueness of the event, or other circumstances. Finally, at block 370 a desired control panel response to the detection of the event is defined such that the control panel will instigate the desired response upon detection of the specified event in the detection zone.

Figure 8:
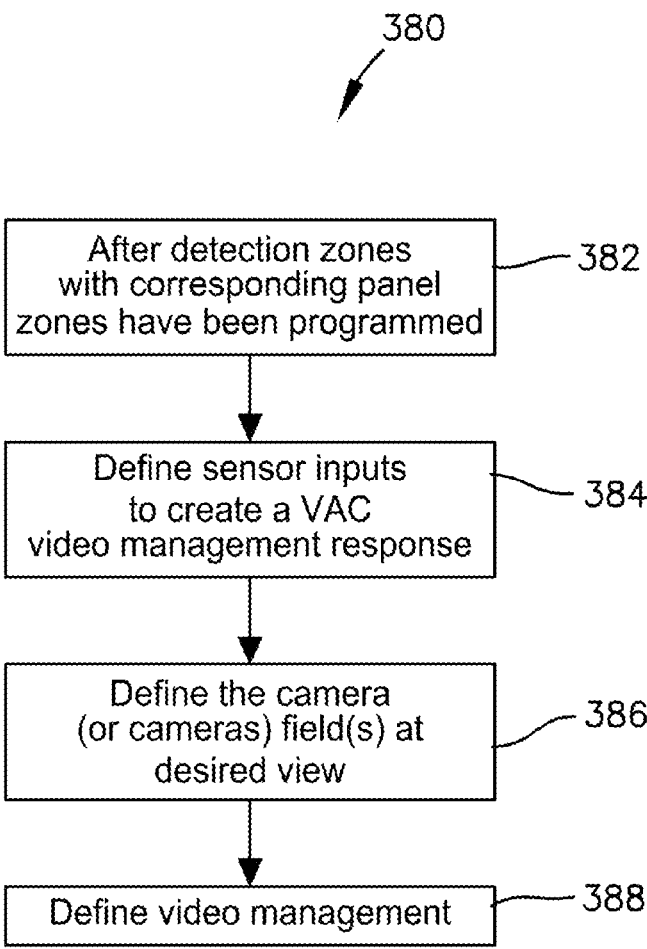
FIG. 8 is a flow diagram of an exemplary configuration and correlation of detection zones and panel zones.

Turning to FIG. 8, a block diagram of an exemplary embodiment of defining the management of video associated with the defined detection zones and responses is depicted as 380. At block 384, with detection zones and corresponding panel zones programmed, control panel sensor inputs to create a desired VAC video management response are identified. At block 386 the camera field(s) of view to be managed in response to the sensors inputs identified at block 384 are defined, and at block 388 the desired video management—i.e., the desired presentation, distribution, and storage of captured videos—is defined.

Figure 9:
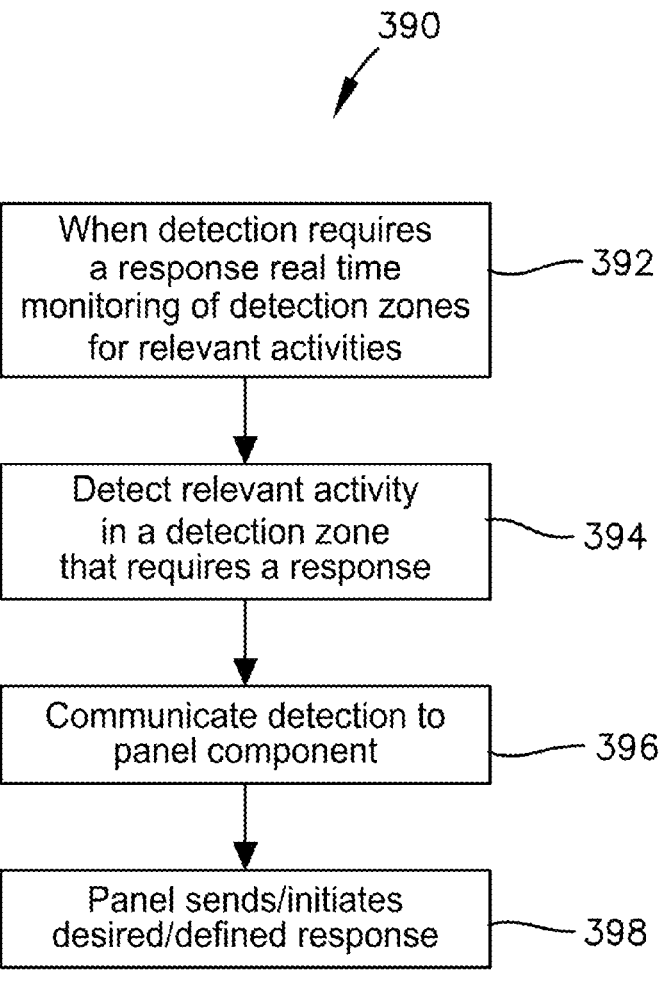
FIG. 9 is a flow diagram of an exemplary real time monitoring of detection zones for activities.

Finally, looking to FIG. 9, an exemplary sequence of steps in response to detection of an event or activity is depicted as 390. At block 392, detection of events requiring real time monitoring is initiated. At block 394, relevant activity requiring a response is detected in a detection zone. At block 396, the detected activity or event is reported to a control panel component. And, at block 398, the panel initiates the desired response—e.g., by activating an alert or alarm and/or by sending information reporting the detected event to other components of the security system.

As just described, it can be seen that the security system having control panel zones implemented with video analytics allows the security system to use cameras connected to the VAC to act as sensors and to provide signals to the control panel in a manner similar to conventional sensors to detect objects and movement within various camera detection areas defined within cameras' field of view. The system further provides for automatic configuration of communication between the VAC and the control panel, and to automatically create control panel zones when a user defines one or more corresponding camera detection areas.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A security system having control panel zones implemented with video analytics, comprising:

a control panel in communication with one or more sensors and operable to generate responses based on a state of each of the one or more sensors, wherein the control panel automatically creates a control panel zone upon creation of a camera detection area via a user interface, and wherein the control panel zone corresponds to the camera detection area;

a video analytic component (VAC) in communication with the control panel, wherein the VAC comprises video circuitry operable to receive and process a video signal from a camera and communication circuitry operable to communicate with the control panel and a network; and a camera in communication with the VAC and operable to provide a video signal corresponding to a field of view of the camera to the VAC, wherein the camera detection area is defined within the field of view of the camera, such that a detectable event within the camera detection area is communicated by the VAC to the control panel as a detected event.

2. The security system of claim 1, further comprising:

a server in communication with the control panel and the VAC; wherein the server is operable to facilitate an initial setup of communication configuration between the control panel and the VAC such that the control panel and VAC can communicate directly with each other.

3. The security system of claim 2, wherein the server comprises a user interface and wherein a control panel zone is created automatically upon creation of a camera detection area via the user interface, wherein the control panel zone corresponds to the camera detection area.

4. The security system of claim 3, wherein a plurality of control panel zones are created automatically upon creation of a plurality of camera detection areas via the user interface, wherein each of the plurality of control panel zones corresponds to a unique one of the plurality of camera detection areas.

5. The security system of claim 4, wherein each of the plurality of control panel zones are responsive to detectable events in a corresponding one of the plurality of camera detection areas.

6. The security system of claim 3, wherein the control panel zone is responsive to detectable events in the camera detection area.

7. The security system of claim 6, wherein the detectable events comprise movement, objects, persons, vehicles, animals, license plates, or combinations thereof.

8. The security system of claim 6, wherein the control panel determines a significance of a detectable event based on information provided by the VAC.

9. The security system of claim 2, wherein the initial setup of communication configuration between the control panel and the VAC comprises allocating ports and Internet protocol (IP) parameters on each of the control panel and the VAC, such that subsequent communication between the control panel and the VAC occurs without involvement of the server.

10. A security system having control panel zones implemented with video analytics, comprising:

a control panel in communication with one or more sensors and operable to generate responses based on a state of each of the one or more sensors, wherein the control panel automatically creates the control panel zone upon creation of a camera detection area via a user interface and based on settings communicated from the VAC;

a video analytic component (VAC) in communication with the control panel, wherein the VAC is operable to receive and process a video signal from a camera and to communicate directly with the control panel, wherein the VAC stores the user-defined camera detection areas and communicates corresponding zone-creation data to the control panel; and a camera in communication with the VAC and operable to provide a video signal corresponding to a field of view of the camera to the VAC; wherein a camera detection area defined within the field of view of the camera creates a control panel zone at the control panel such that the control panel zone is responsive to detectable events in the camera detection area, and wherein the control panel generates the control panel zone only after receiving the camera detection area settings from the VAC.

11. The security system of claim 10, wherein an initial setup of communication configuration between the control panel and the VAC is facilitated by a server in communication with the control panel and the VAC such that the control panel and VAC subsequently communicate directly with each other without involvement of the server.

12. The security system of claim 11, wherein the initial setup of communication configuration between the control panel and the VAC comprises allocating ports and Internet protocol (IP) parameters on each of the control panel and the VAC such that subsequent communication between the control panel and the VAC occurs without involvement of the server.

13. The security system of claim 12, wherein the server comprises a user interface and wherein the control panel zone is created automatically upon creation of the camera detection area via a user interface, wherein the control panel zone corresponds to the camera detection area.

14. The security system of claim 13, wherein the control panel zone is responsive to detectable events within the camera detection area.

15. The security system of claim 14, wherein the detectable events comprise movement, objects, persons, vehicles, animals, license plates, or combinations thereof.

16. The security system of claim 15, wherein the control panel determines a significance of a detectable event based on information provided by the VAC.

17. The security system of claim 16, wherein the significance of a detectable event is based on historical information, time of day, schedule, user input, or combinations thereof.

18. The security system of claim 11, wherein the camera detection area comprises a plurality of camera detection areas and wherein the control panel zone comprises a plurality of control panel zones, such that each of the plurality of control panel zones corresponds to a unique one of the plurality of camera detection areas.

19. The security system of claim 18, wherein each of the plurality of control panel zones is responsive to detectable events in a corresponding one of the plurality of camera detection areas.

20. The security system of claim 10, wherein the control panel processes each camera detection area as a sensor, and wherein the control panel generates an alert based on a detectable events in the camera detection area.

* * * * *